United States Patent
Chiu

(10) Patent No.: US 10,394,486 B2
(45) Date of Patent: Aug. 27, 2019

(54) METHODS FOR GARBAGE COLLECTION IN A FLASH MEMORY AND APPARATUSES USING THE SAME

(71) Applicant: Silicon Motion, Inc., Jhubei (TW)

(72) Inventor: Shen-Ting Chiu, Houlong Township (TW)

(73) Assignee: Silicon Motion, Inc., Jhubei (TW)

( * ) Notice: Subject to any disclaimer, the term of this patent is extended or adjusted under 35 U.S.C. 154(b) by 27 days.

(21) Appl. No.: 15/349,722

(22) Filed: Nov. 11, 2016

(65) Prior Publication Data
US 2017/0168750 A1 Jun. 15, 2017

(30) Foreign Application Priority Data
Dec. 9, 2015 (TW) .............................. 104141255 A

(51) Int. Cl.
*G06F 3/06* (2006.01)
(52) U.S. Cl.
CPC .......... *G06F 3/0652* (2013.01); *G06F 3/0608* (2013.01); *G06F 3/0679* (2013.01)
(58) Field of Classification Search
CPC ............. G06F 12/0253; G06F 12/0238; G06F 12/0246; G06F 2212/7205; G06F 2212/72; G06F 3/0652; G06F 3/0608; G06F 3/0679
See application file for complete search history.

(56) References Cited

U.S. PATENT DOCUMENTS

| | | | |
|---|---|---|---|
| 8,266,501 B2 | 9/2012 | Jeddeloh | |
| 8,463,826 B2 | 6/2013 | Post et al. | |
| 2011/0055455 A1 | 3/2011 | Post et al. | |
| 2012/0191937 A1* | 7/2012 | Feldman | G06F 12/0253 |
| | | | 711/170 |
| 2014/0215129 A1 | 7/2014 | Kuzmin et al. | |
| 2015/0186072 A1 | 7/2015 | Darragh et al. | |
| 2015/0193300 A1 | 7/2015 | Shalvi et al. | |
| 2015/0253999 A1 | 9/2015 | Nemazie et al. | |

FOREIGN PATENT DOCUMENTS

TW 201523618 A 6/2015

OTHER PUBLICATIONS

Office Action of corresponding TW application, published on Feb. 13, 2018.

* cited by examiner

*Primary Examiner* — Tracy A Warren
(74) *Attorney, Agent, or Firm* — Wang Law Firm, Inc.

(57) ABSTRACT

The invention introduces a method for GC (Garbage Collection) in a flash memory, performed by a processing unit, including at least the following steps: reading n×m pages of good data from storage sub-units, wherein n indicates the quantity of storage sub-units sharing one channel and m indicates the quantity of pages for programming data into one storage sub-unit; and repeatedly performing a loop for directing each of the storage sub-units to program m pages of good data until all of the storage sub-units are operated in busy states.

20 Claims, 10 Drawing Sheets

US 10,394,486 B2

METHODS FOR GARBAGE COLLECTION IN A FLASH MEMORY AND APPARATUSES USING THE SAME

CROSS REFERENCE TO RELATED APPLICATIONS

This Application claims priority of Taiwan Patent Application No. 104141255, filed on Dec. 9, 2015, the entirety of which is incorporated by reference herein.

BACKGROUND

Technical Field

The present invention relates to flash memory, and in particular to methods for garbage collection in a flash memory and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads complete pages from the memory cells and writes complete pages to the memory cells. After a page of data is read from the array into a buffer inside the device, the host can access the data bytes or words one by one by serially clocking them out using a strobe signal.

If the data in some of the pages of the blocks are no longer needed (these are also called stale pages), only the pages with good data in those blocks are read and re-programed into another previously erased empty block. Then the free blocks are available for new data after being erased. This is a process called GC (garbage collection). The process of GC involves reading and re-programming data to the flash memory. This means that a new re-program will first require a read of the whole block. However, performing GC this way consumes excessive time. Accordingly, what is needed are methods for GC in a flash memory and apparatuses using the same to reduce the access time.

BRIEF SUMMARY

An embodiment of the invention introduces a method for GC (Garbage Collection) in a flash memory, performed by a processing unit, including at least the following steps: reading n×m pages of good data from storage sub-units, wherein n indicates the quantity of storage sub-units sharing one channel and m indicates the quantity of pages for programming data into one storage sub-unit; and repeatedly performing a loop for directing each of the storage sub-units to program m pages of good data until all of the storage sub-units are operated in busy states.

An embodiment of the invention introduces a method for GC in a flash memory, performed by a processing unit, including at least the following steps: scheduling data-read commands with physical addresses for reading n×m pages of good data, wherein n indicates the quantity of storage sub-units sharing one channel and m indicates the quantity of pages for programming data into one storage sub-unit; issuing the next data-read command with a physical address to the next storage sub-unit before receiving good data corresponding to each data-read command except for the last data-read command, which has been issued, from one storage sub-unit; and directing the storage sub-units to program the n×m pages of good data.

An embodiment of the invention introduces an apparatus for GC in a flash memory including at least a channel coupled to storage sub-units, and a processing unit coupled to the channel. The processing unit reads n×m pages of good data from the storage sub-units, where n indicates the quantity of storage sub-units sharing one channel and m indicates the quantity of pages for programming data into one storage sub-unit; and repeatedly performs a loop for directing each of the storage sub-units to program m pages of good data until all of the storage sub-units are operated in busy states.

An embodiment of the invention introduces an apparatus for GC in a flash memory including at least a channel coupled to storage sub-units, and a processing unit coupled to the channel. The processing unit schedules data-read commands with physical addresses for reading n×m pages of good data, where n indicates the quantity of storage sub-units sharing one channel and m indicates the quantity of pages for programming data into one storage sub-unit; issues the next data-read command with a physical address to the next storage sub-unit before receiving good data corresponding to each data-read command except for the last data-read command, which has been issued, from one storage sub-unit; and directs the storage sub-units to program the n×m pages of good data.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
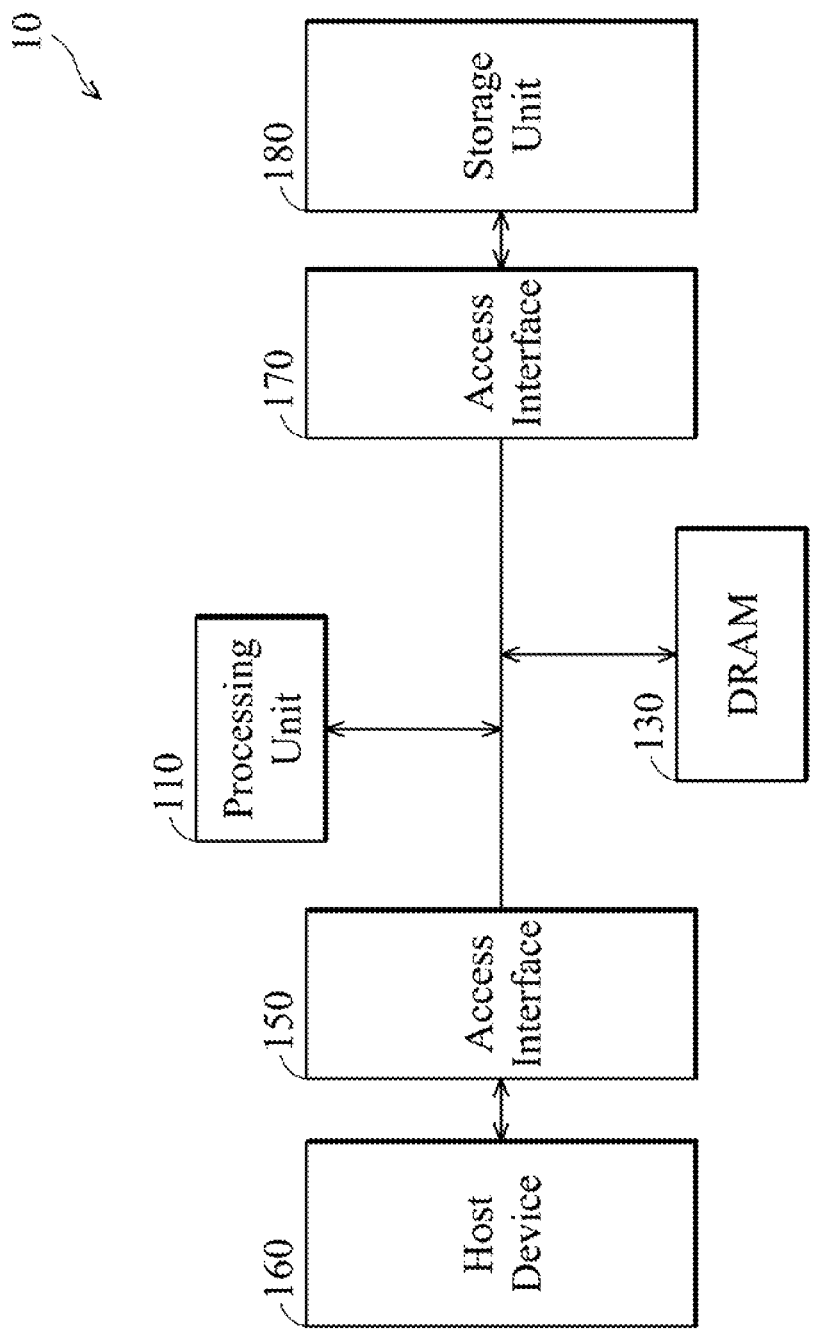
FIG. 1 is the system architecture of a flash memory according to an embodiment of the invention.

FIG. 1 is the system architecture of a flash memory according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 10 through an access interface 170 and reads data from a designated address thereof through the same interface 170. The processing unit 110 may be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with other electronic devices through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
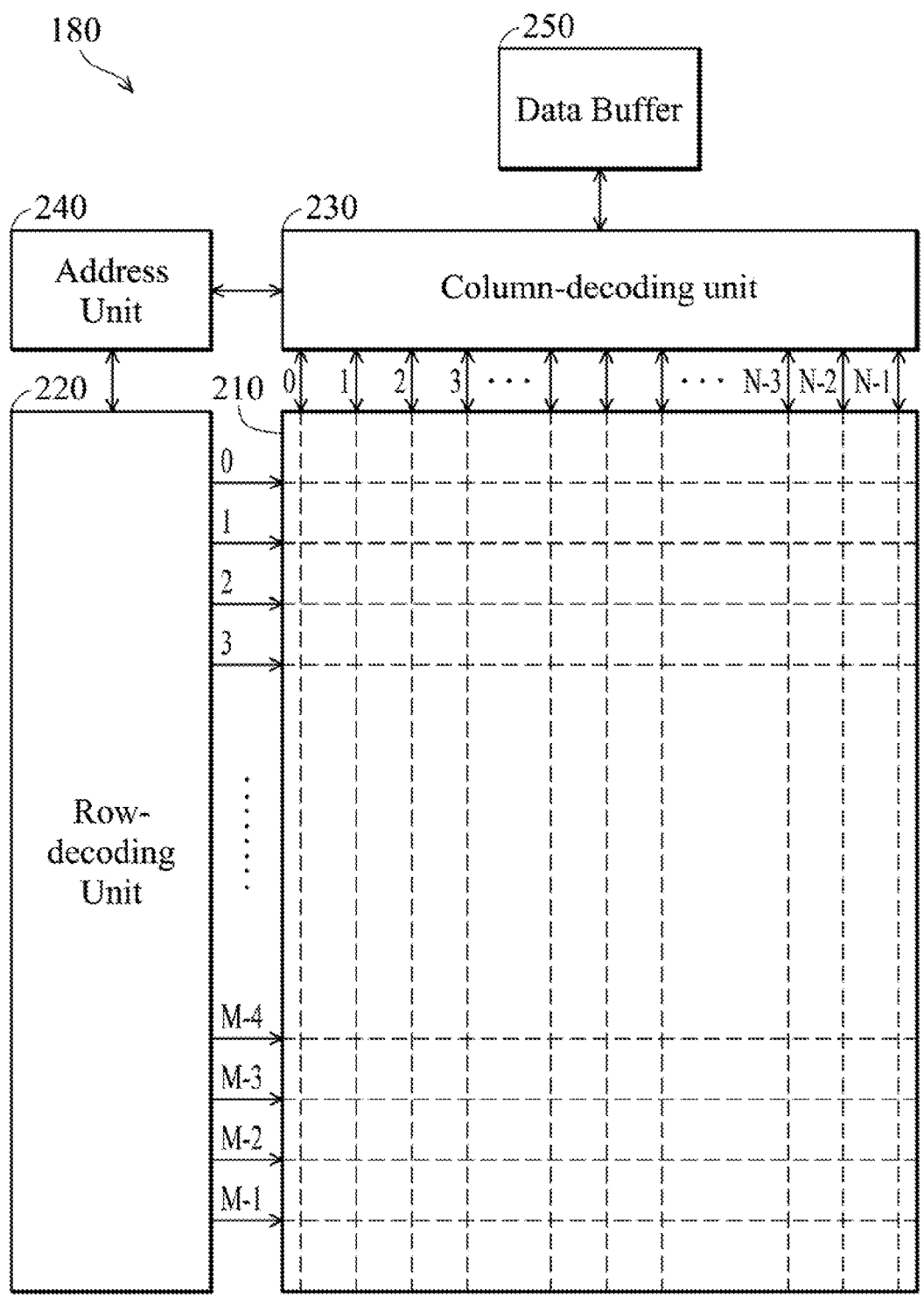
FIG. 2 shows a schematic diagram depicting a storage unit of a flash memory according to an embodiment of the invention.

FIG. 2 shows a schematic diagram depicting a storage unit of a flash memory according to an embodiment of the invention. The storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3:
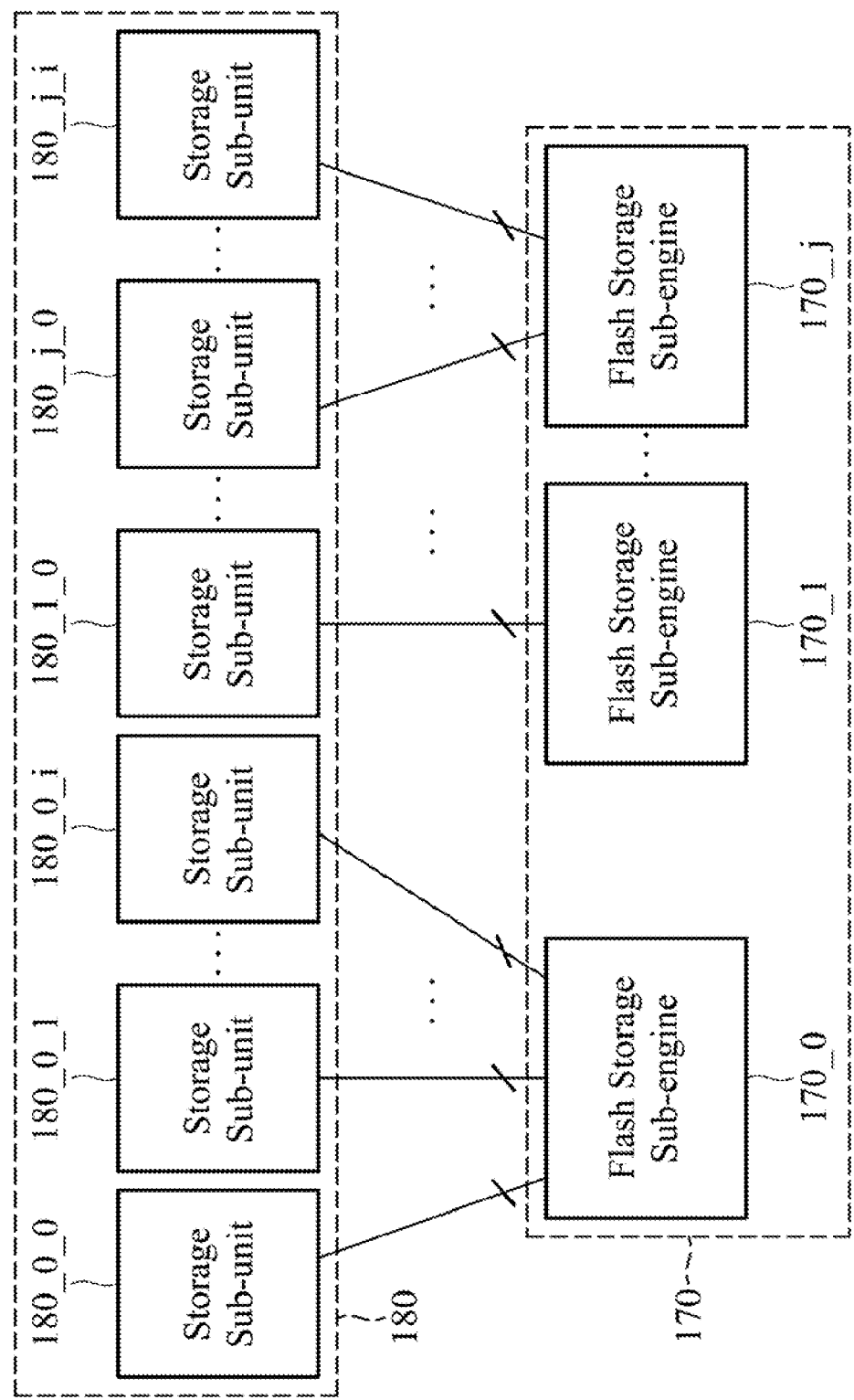
FIG. 3 is a schematic diagram illustrating interfaces to storage units of a flash storage according to an embodiment of the invention.
Figure 4:
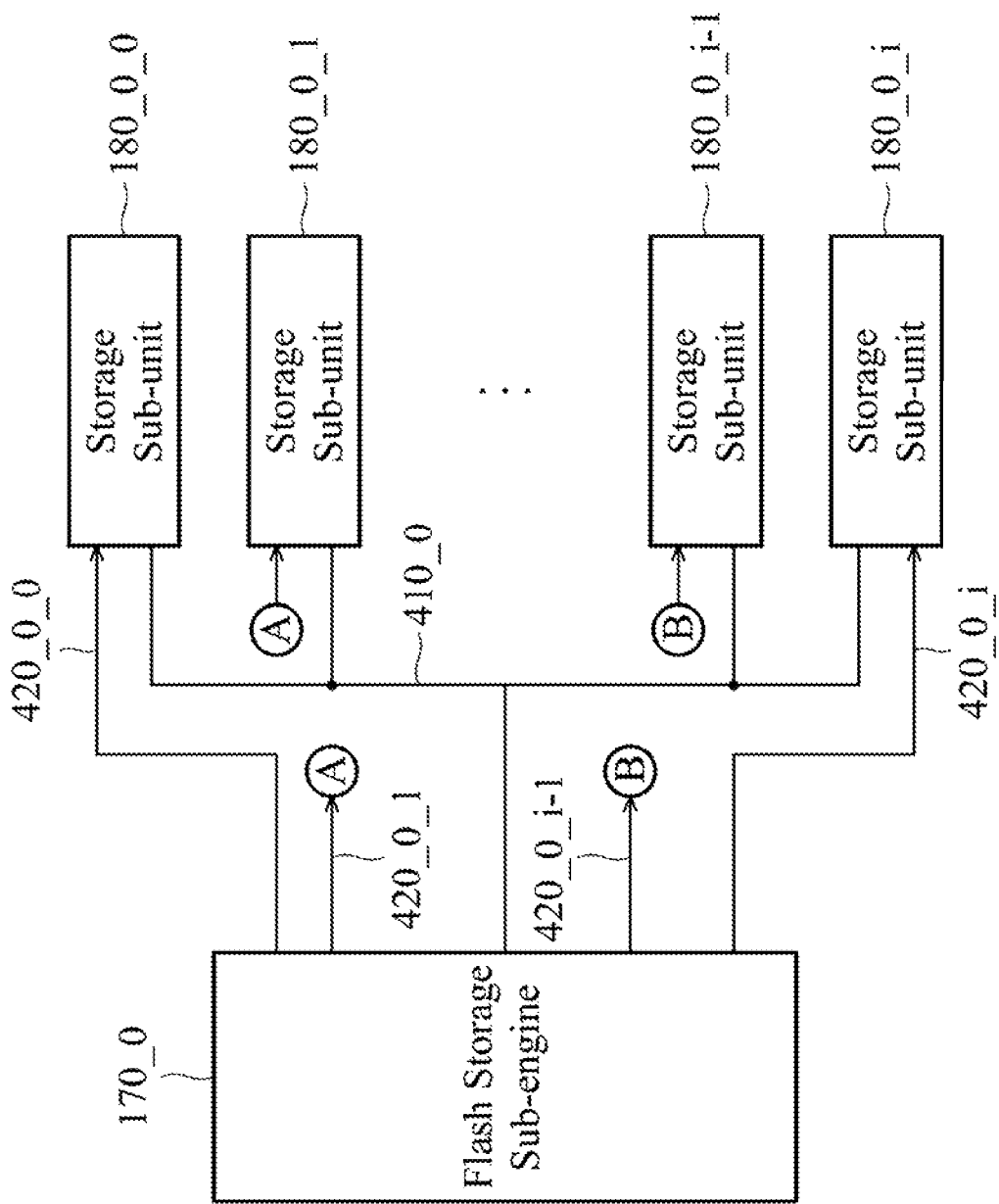
FIG. 4 is a schematic diagram depicting connections between one access sub-interface and multiple storage sub-units according to an embodiment of the invention.

The storage unit 180 may contain multiple storage sub-units and each storage sub-unit may be practiced in a single die and use an access sub-interface to communicate with the processing unit 110. FIG. 3 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 4 is a schematic diagram depicting connections between one access sub-interface and multiple storage sub-units according to an embodiment of the invention. The processing unit 110, through the access sub-interface 170_0, may use independent CE control signals 420_0_0 to 420_0_i to select one of the connected storage sub-units 180_0_0 and 180_0_i, and then read data from the designated location of the selected storage sub-unit via the shared data line 410_0.

A master device 160 may provide an LBA (Logical Block Address) to the processing unit 110 through the access interface 150 to indicate a particular region for data to be read from or written into. However, in order to optimize the data write efficiency, the access interface 170 distributes data with continuous LBAs across different physical regions of different storage sub-units. Thus, a mapping table, also referred to as an H2F (Host-to-Flash) table, is stored to indicate which location of a storage sub-unit data of each LBA is physically stored in. In one implementation, a DRAM may allocate enough space to store the mapping table.

Figure 5:
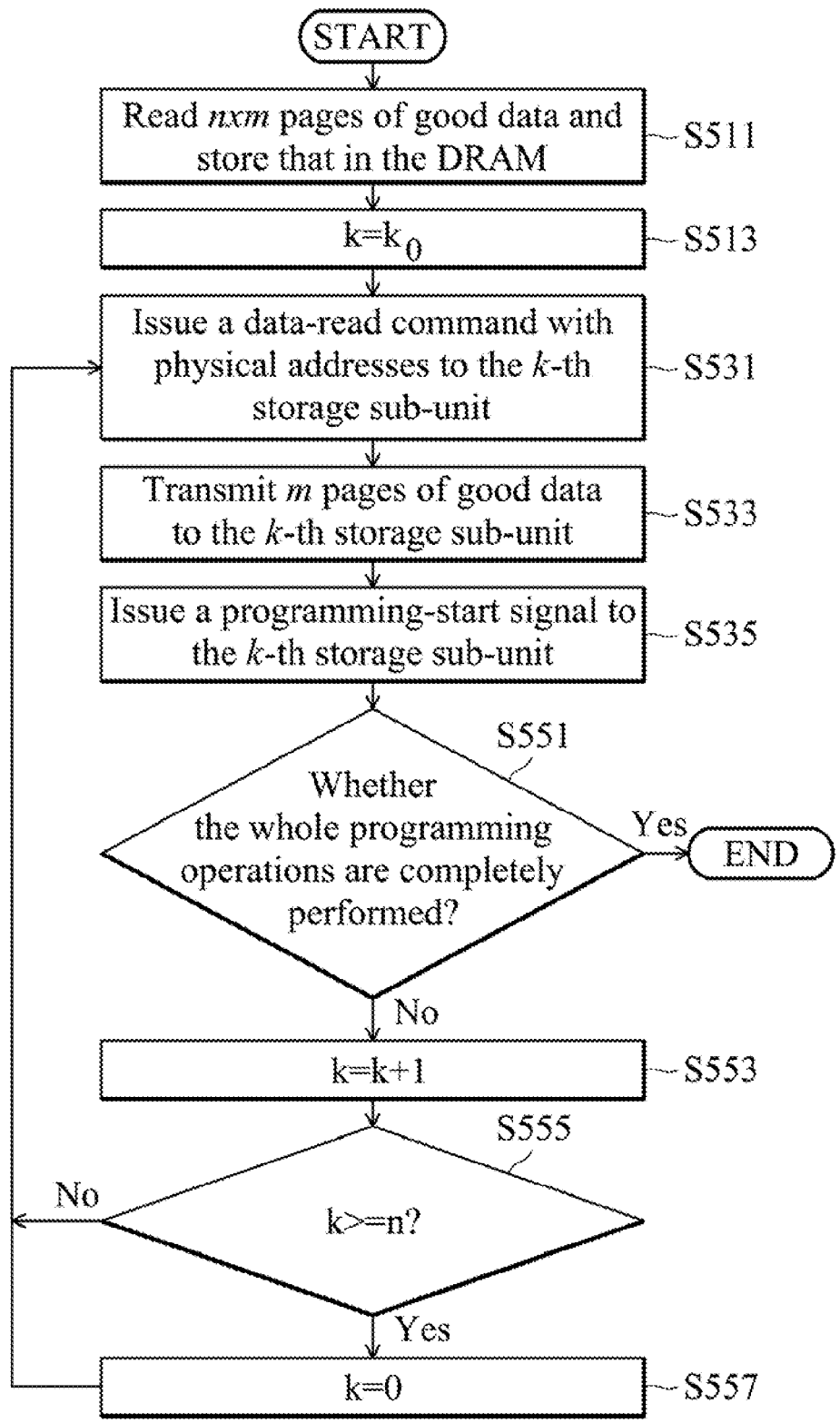
FIG. 5 is a flowchart illustrating a method for GC in a flash memory, performed by a processing unit, according to an embodiment of the invention.

Assume that n storage sub-units share one channel and a basic quantity for programming data into one storage sub-unit is m pages: In order to make the programming operations for GC more efficient, the embodiments of the invention read n×m pages of good data from storage sub-units, and sequentially direct the storage sub-units until all storage sub-units are operated in busy states to make each of which to program m pages of good data. It should be noted that, after the transmission of m pages of good data to one storage sub-unit is completed, there is no need to wait for the completion of the physical programming of the storage sub-unit and another m pages of good data can be transmitted to the next storage sub-unit. The aforementioned design allows the processing unit 110 to transmit data to the next storage sub-unit during the physical programming of one storage sub-unit and perform other sorts of computations after all storage sub-units start their physical programming operations. FIG. 5 is a flowchart illustrating a method for GC in a flash memory, performed by a processing unit, according to an embodiment of the invention. After reading n×m pages of good data through the access interface 170 and storing that in the DRAM (Dynamic Random Access Memory) (step S511), the processing unit 110 initiates a variable $k=k_0$ (step S513). In addition to the good data, the read blocks include stale data. $k_0$ is a constant between 0 and n−1 to indicate a serial number of the storage sub-unit, which firstly programs data. It should be noted that the DRAM 130 has sufficient space to store n×m pages of good data. In step S511, the processing unit 110 may obtain physical addresses of n×m pages of good data according to the H2F table of the DRAM 130 and direct the storage unit 130 to read data from the physical addresses. Next, the processing unit 110 repeatedly performs a loop (step S531 to S557) until n×m pages of good data are programmed into the storage unit 180 (the "Yes" path of step S551).

In each iteration, the processing unit 110 reads m pages of good data from the DRAM 130 and issues a data-read command with physical addresses to the k-th storage sub-unit through the access interface 170 (step S531). Refer to FIG. 4. For example, in step S531, the processing unit 110 may enable one of independent CE signals 420_0_0 to 420_0_i through the access sub-interface 170_0 to select the k-th storage sub-unit from the storage sub-units 180_0_0 to 180_0_i, and subsequently, issue a data-read command with physical addresses to the k-th storage sub-unit through the shared data line 410_0. It should be noted that the physical addresses indicate m pages of the same block. Next, the processing unit 110 transmits m pages of good data to the k-th storage sub-unit (step S533) and issues a programming-start signal to the k-th storage sub-unit to direct a start of a physical programming (step S535). Refer to FIG. 4. For example, in step S533, the processing unit 110 may transmit m pages of good data to the k-th storage sub-unit through the shared data line 410_0. For example, in step S535, the processing unit 110 may toggle the WE signal corresponding to the k-th storage sub-unit to direct a start of a physical programming. After receiving an instruction from the processing unit 110, the k-th storage sub-unit enters the busy state and performs a physical programming. Next, when the whole programming operation is not completely performed (the "No" path of step S551), the processing unit 110 increases the variable k by one (step S533), and determines whether the variable k is greater than or equal to n (step S555). If so, the processing unit 110 sets the variable k to 0 (step S557) and directs the 0-th storage sub-unit to program m pages of good data (steps S531 to S553). Otherwise, the processing unit 110 directs the k-th storage sub-unit to program m pages of good data (steps S531 to S553). After the whole programming operation is completely performed (the "Yes" path of step S551), the processing unit 110 ends GC of n×m pages.

Figure 6:
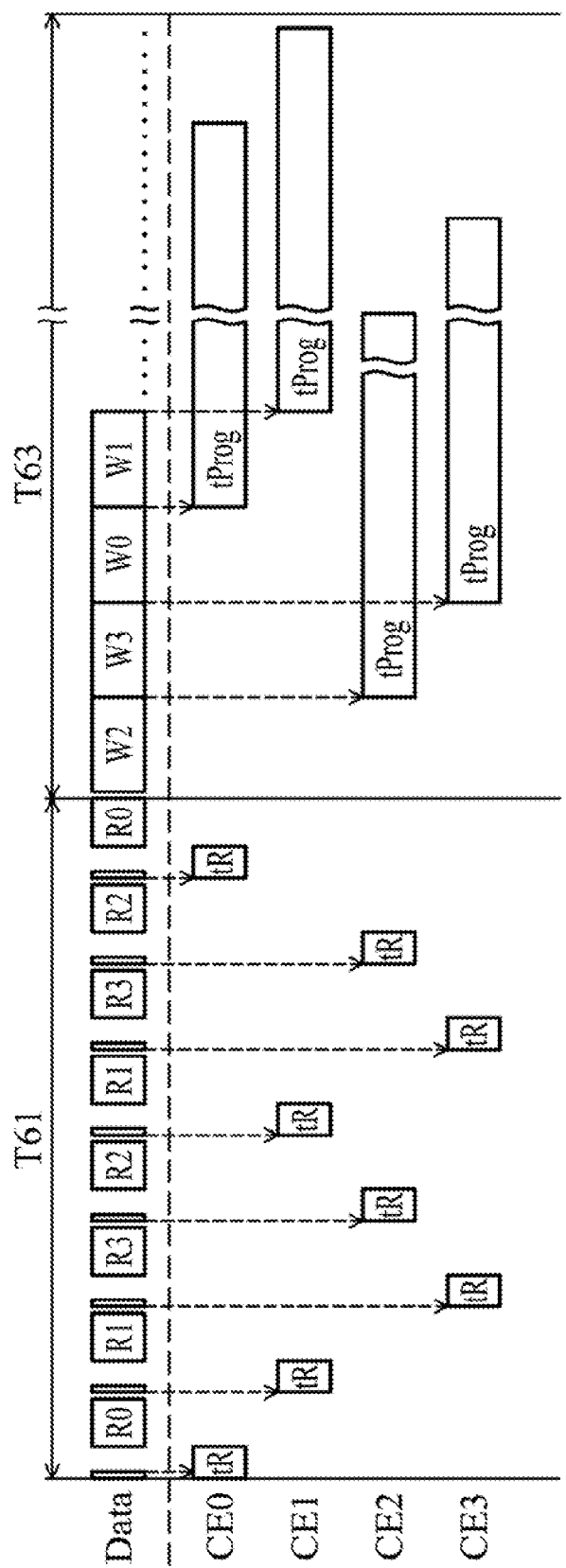
FIG. 6 is a schematic diagram of GC according to an embodiment of the invention.

FIG. 6 is a schematic diagram of GC according to an embodiment of the invention. Assume that 4 storage sub-units share one channel, the minimum unit for programming data into one storage sub-unit is 2 pages and each page contains data of 4K, 8K or 16K bytes, or an arbitrary length: Refer to FIGS. 4 and 5. In step S511, the processing unit 110 may read 8 (4×2) pages of good data from 4 storage sub-units (denoted as CE0 to CE3) through the access interface 170 and store the good data in the DRAM 130 in the time period T61. Specifically, after issuing a data-read command with physical addresses to a designated storage sub-unit through the shared data line 410_0, the processing unit 110 waits for a time period tR (for example, 30, 40 or 70 μs), in which the storage sub-unit prepares the data of the physical addresses. Subsequently, the processing unit 110 receives the designated pages of data in a time period Rx (for example, 45 or 50 μs) through the shared data time 410_0, where x may be an integer from 0 to 3. In order to reduce the time period T62 for data programming, in steps S531 to S535, the processing unit 110 may issue a data-programming command with physical addresses and a programming-start signal to a designated storage sub-unit through the access interface 170 in a time period Wx (for example, 90 or 100 μs), where x indicates an integer from 0 to 3, and then, issues a data-programming command with physical addresses and a programming-start signal to the next storage sub-unit through the access interface 170 with no need to wait for a physical programming performed by the storage sub-unit. The storage sub-unit performs the physical programming in a time period tProg (for example, 1200, 1250 or 1300 μs) and informs the processing unit 110 whether the physical programming is successful at the end. When the physical programming is successful, the processing unit 110 may update the H2F table of the DRAM 130 to reflect the outcome of the physical programming.

Figure 7:
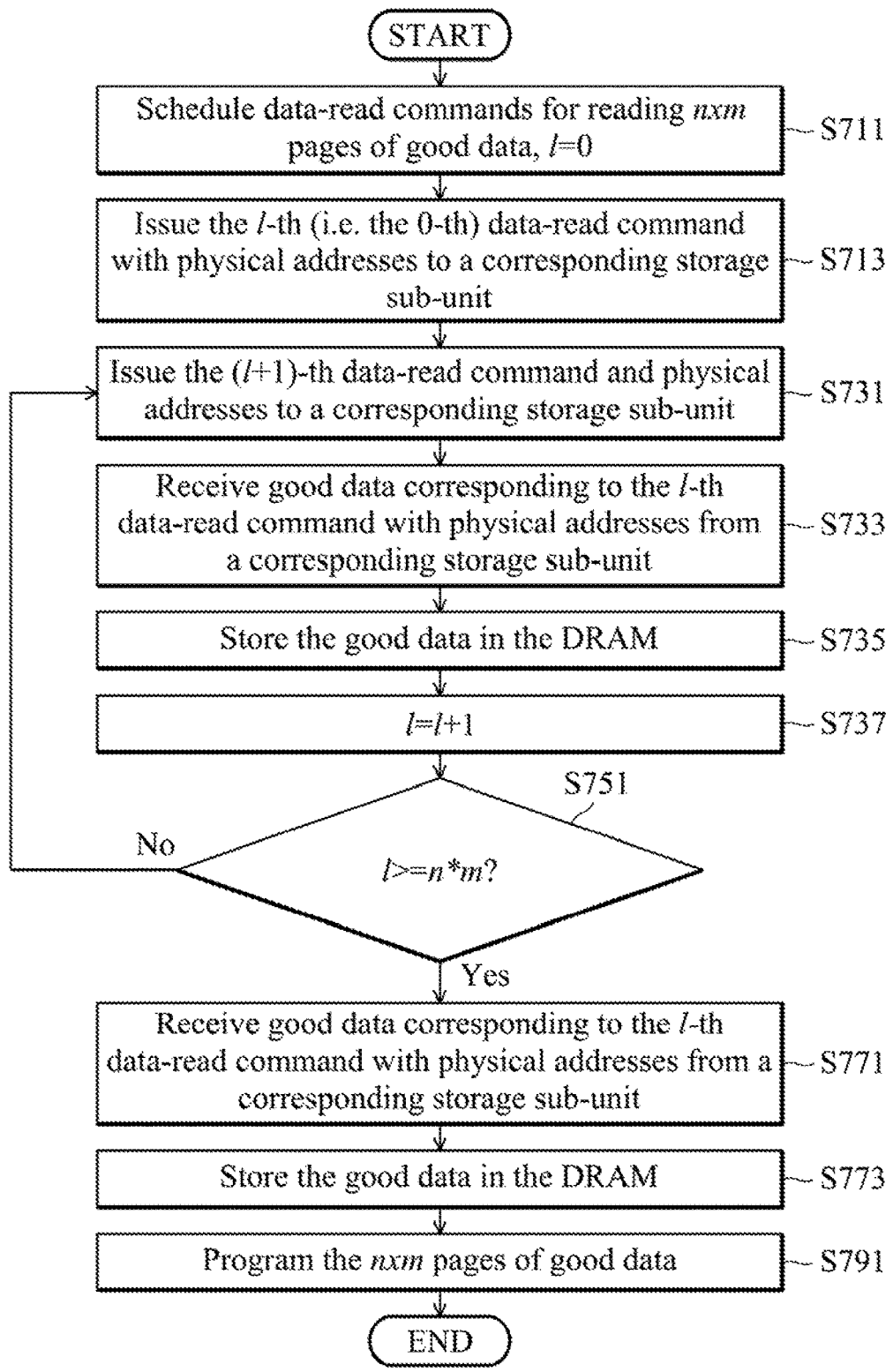
FIG. 7 is a flowchart illustrating a method for GC in a flash memory, performed by a processing unit, according to an embodiment of the invention.

In order to make the programming operations for GC more efficient, the embodiments of the invention schedule data-read commands with physical addresses for reading n×m pages of good data, and issue the next data-read command with physical addresses to the next storage sub-unit before receiving good data corresponding to each data-read command except for the last data-read command, which has been issued. The aforementioned design ensures that the time periods for reading good data from the storage sub-units can be arranged more compactly than what is shown in FIG. 6 by reducing the idle time between data reception for two data-read commands. FIG. 7 is a flowchart illustrating a method for GC in a flash memory, performed by a processing unit, according to an embodiment of the invention. The processing unit 110 schedules data-read commands for reading n×m pages of good data and initiates a variable l=0, where l indicates a serial number of the data-read commands (step S711). In step S711, the processing unit 110 may obtain physical addresses of n×m pages of good data according to the H2F table of the DRAM 130 and accordingly arrange the data-read commands. The processing unit 110 issues the l-th (i.e. the 0-th) data-read command with physical addresses to a corresponding storage sub-unit (step S713). Subsequently, the processing unit 110 repeatedly performs a loop (steps S731 to S751) until all data-read commands for reading n×m pages of good data are issued to the storage unit 180 completely (the "Yes" path of step S751).

In each iteration, after issuing the (l+1)-th data-read command and physical addresses to a corresponding storage sub-unit through the access interface 170 (step S731), the processing unit 110 receives good data corresponding to the l-th data-read command with physical addresses from a corresponding storage sub-unit (step S733), stores the good data in the DRAM 130 (step S735) and increases the variable l by one (step S737). Next, the processing unit 110 determines whether the variable l is greater than or equal to n×m (step S751). If not, the processing unit 110 continues to issue the (l+1)-th data-read command with physical addresses to a corresponding storage sub-unit through the access interface 170 to start the next iteration (step S731). If so, the processing unit 110 receives good data corresponding to the l-th data-read command with physical addresses from a corresponding storage sub-unit (step S771) and stores the good data in the DRAM 130 (step S773).

After reading n×m pages of good data and stores the good data in the DRAM 130, the processing unit 110 programs the n×m pages of good data into the storage unit 180 through the access interface 170 (step S791).

Figure 8:
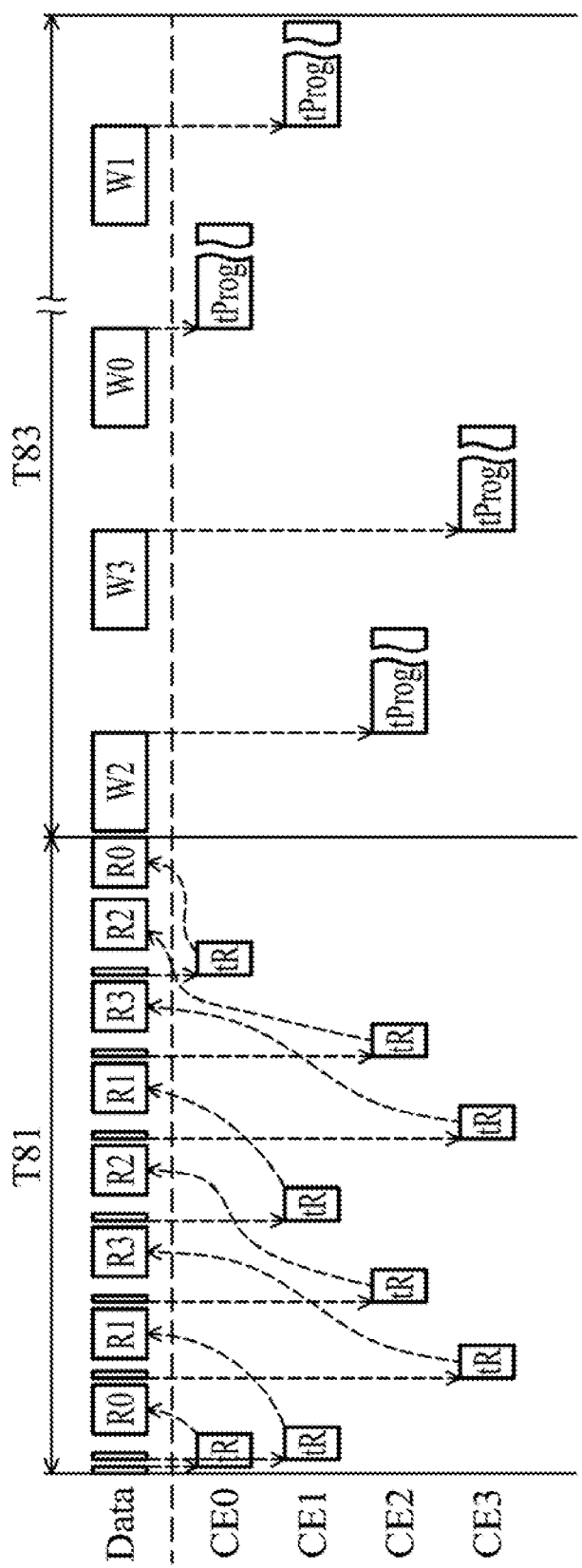
FIG. 8 is a schematic diagram of GC according to an embodiment of the invention.

FIG. 8 is a schematic diagram of GC according to an embodiment of the invention. Assume that 4 storage sub-units share one channel, the minimum unit for programming data into one storage sub-unit is 2 pages and each page contains data of 4K, 8K or 16K bytes, or an arbitrary length: Refer to FIGS. 4 and 7. The time period T81 is spend to read n×m pages of good data. In step S713, the processing unit 110 issues a data-read command with physical addresses to a designated storage sub-unit through the shared data line 410_0. The loop of steps S731 to S751 is repeatedly performed to receive good data corresponding to this data-read command with physical addresses through the shared data line 410_0 by the processing unit 110 after issuing the next data-read command with physical addresses. For example, the processing unit 110 issues a data-read command with physical addresses to the storage sub-unit CE1 through the shared data line 410_0, receives good data from the storage sub-unit CE0, issues a data-read command with physical addresses to the storage sub-unit CE3, receives good data from the storage sub-unit CE1, and so on. After the loop is performed completely, the processing unit 110 receives the last good data from the storage sub-unit CE0 through the shared data line 410_0. Compared with FIG. 6, the idle time between data reception of two pages can be reduced by using the method shown in FIG. 7.

Figure 9A:
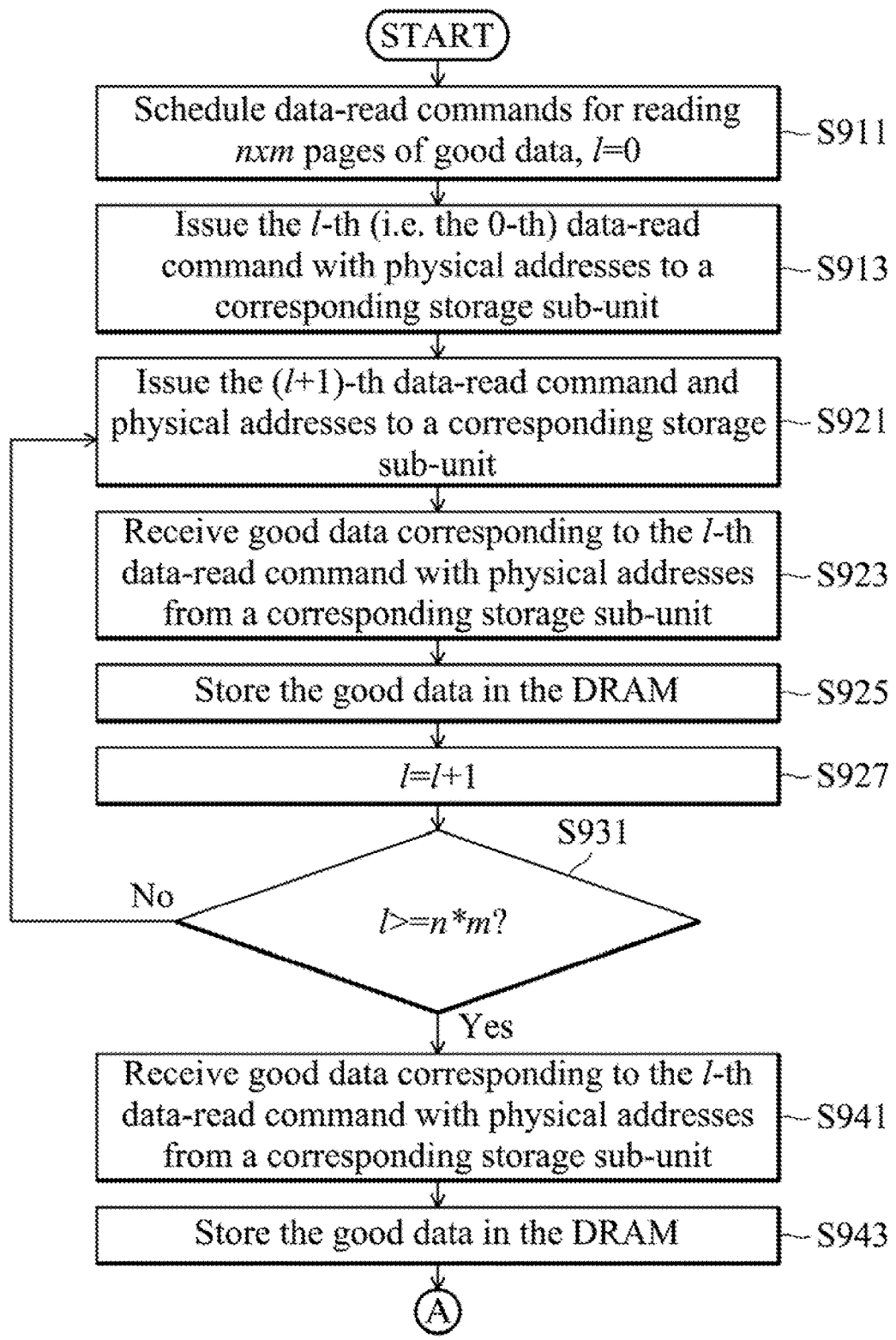
FIGS. 9A and 9B are flowcharts illustrating a method for GC in a flash memory, performed by a processing unit, according to an embodiment of the invention.
Figure 9B:
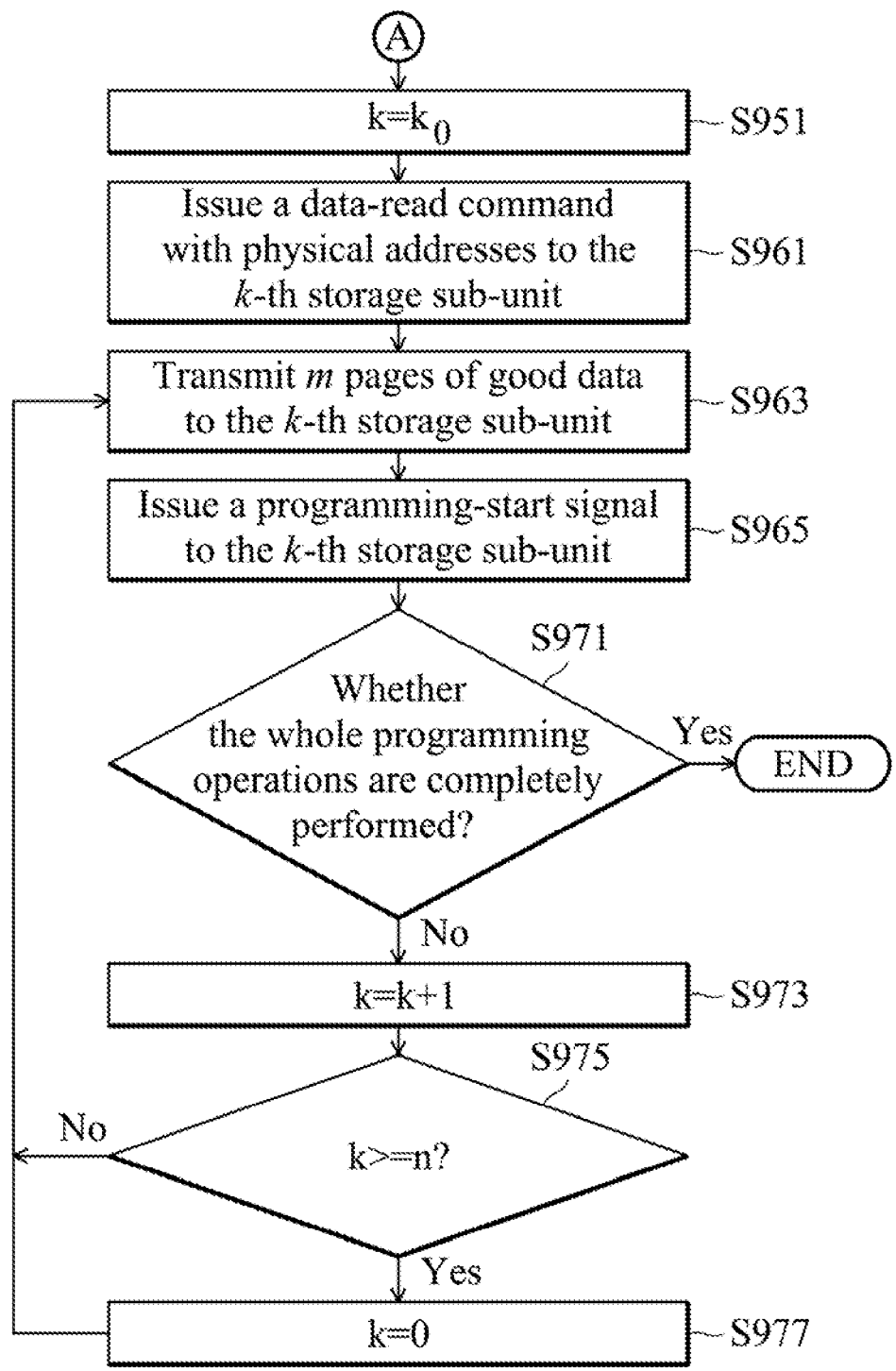

FIGS. 9A and 9B are flowcharts illustrating a method for GC in a flash memory, performed by a processing unit, according to an embodiment of the invention. The method has the advantages of data-read efficiency as shown in FIG. 7 and data-programming efficiency as shown in FIG. 5. For details of steps S911 to S943 refer to the descriptions of steps S711 to S773 of FIG. 7. For details of steps S951 to S971 refer to the descriptions of steps S513 to S557 of FIG. 5.

Although the embodiment has been described as having specific elements in FIGS. 1 to 4, it should be noted that additional elements may be included to achieve better performance without departing from the spirit of the invention. While the process flow described in FIGS. 5, 7, 9A and 9B include a number of operations or tasks that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for GC (Garbage Collection) in a flash memory, performed by a processing unit, comprising:
in a first time period, reading a first number of pages of good data from a plurality of storage sub-units sharing a channel, wherein the first number is a product of n and m, and n indicates a quantity of the plurality of storage sub-units sharing the channel, and m indicates a basic quantity of pages for programming data into one of the plurality of storage sub-units; and
in a second time period following the first time period, repeatedly performing a loop for directing each of the plurality of the storage sub-units to program m pages of the first number of pages of good data until all of the plurality of storage sub-units are operated in busy states.

2. The method of claim 1, wherein, while the loop is being repeatedly performed, after transmission of the m pages of the first number of pages of good data to a first storage sub-unit, next m pages of the first number of pages of good data are transmitted to a second storage sub-unit without waiting for completion of physical programming of the first storage sub-unit.

3. The method of claim 1, wherein the step of reading the first number of pages of good data from the plurality of storage sub-units comprises storing the first number of pages of good data in a DRAM (Dynamic Random Access Memory), and, in each iteration of the loop, the m pages of the first number of pages of good data are read from the DRAM and one of the plurality of storage sub-units is directed to program the m pages of the first number of good data.

4. The method of claim 1, wherein the step of repeatedly performing the loop for directing each of the plurality of the storage sub-units to program the m pages of the first number of pages of good data until all of the plurality of storage sub-units are operated in busy states comprises:
in each iteration of the loop, issuing a data-programming command with a physical address to a designated one of the plurality of storage sub-units;
transmitting the m pages of the first number of pages of good data to the designated storage sub-unit; and
issuing a programming-start signal to the designated storage sub-unit.

5. The method of claim 4, wherein the step of issuing the data-programming command with the physical address to the designated one of the plurality of storage sub-units comprises:
enabling a designated one of CE (Chip Enable) signals to select the designated storage sub-unit; and
issuing the data-programming command with the physical address to the designated storage sub-unit through a data line shared by the plurality of storage sub-units.

6. The method of claim 5, wherein the step of transmitting the m pages of the first number of pages of good data to the designated storage sub-unit comprises:
transmitting the m pages of the first number of pages of good data to the designated storage sub-unit through the data line.

7. The method of claim 1, wherein the step of reading the first number of pages of good data from the plurality of storage sub-units comprises:
scheduling a plurality of data-read commands with physical addresses for reading the first number of pages of good data; and repeatedly issuing the next data-read command with a physical address to the next one of the plurality of storage sub-units before receiving a page of the first number of pages of good data corresponding to each data-read command, which has been issued, from one of the plurality of storage sub-units until the last data read-command is issued.

8. A method for GC (Garbage Collection) in a flash memory, performed by a processing unit, comprising:
scheduling a plurality of data-read commands with physical addresses for reading a first number of pages of good data, wherein the first number is a product of n and m, and n indicates a quantity of a plurality of storage sub-units sharing one channel and m indicates a basic quantity of pages for programming data into one of the plurality of storage sub-units;
in a first time period, repeatedly issuing the next data-read command with a physical address to the next one of the plurality of storage sub-units before receiving good data corresponding to each data-read command, which has been issued, from one of the plurality of storage sub-units until the last data-read command is issued; and
in a second time period following the first time period, directing the plurality of storage sub-units to program the first number of pages of good data.

9. The method of claim 8, further comprising:
storing the first number of pages of good data in a DRAM (Dynamic Random Access Memory).

10. The method of claim 8, wherein the data-read commands with the physical addresses are issued through a data line shared by the plurality of storage sub-units and each page of the good data is received through the data line.

11. An apparatus for GC (Garbage Collection) in a flash memory, comprising:
a channel, coupled to a plurality of storage sub-units;
a processing unit, coupled to the channel, reading a first number of pages of good data from the storage sub-units in a first time period, wherein the first number is a product of n and m, and n indicates a quantity of the plurality of storage sub-units sharing one channel, and m indicates a basic quantity of pages for programming data into one of the plurality of storage sub-units; and, in a second time period following the first time period, repeatedly performing a loop for directing each of the plurality of storage sub-units to program m pages of the first number of good data until all of the plurality of storage sub-units are operated in busy states.

12. The apparatus of claim 11, wherein, while the loop is being repeatedly performed, after transmission of the m pages of the first number of pages of good data to a first storage sub-unit, next m pages of the first number of pages of good data are transmitted to a second storage sub-unit without waiting for completion of physical programming of the first storage sub-unit.

13. The apparatus of claim 11, wherein the processing unit stores the first number of pages of good data in a DRAM (Dynamic Random Access Memory), and, in each iteration of the loop, the processing unit reads the m pages of the first number of pages of good data from the DRAM and directs one of the plurality of storage sub-units to program the m pages of the first number of pages of good data.

14. The apparatus of claim 11, wherein the processing unit, in each iteration of the loop, issues a data-programming command with a physical address to a designated one of the plurality of storage sub-units; transmits the m pages of the first number of pages of good data to the designated storage sub-unit; and issues a programming-start signal to the designated storage sub-unit.

15. The apparatus of claim 14, wherein the processing unit enables a designated one of CE (Chip Enable) signals of the channel to select the designated storage sub-unit; and issues the data-programming command with the physical address to the designated storage sub-unit through a data line shared by the plurality of storage sub-units.

16. The apparatus of claim 15, wherein the processing unit transmits the m pages of the first number of pages of good data to the designated storage sub-unit through the data line.

17. The apparatus of claim 11, wherein the processing unit schedules a plurality of data-read commands with physical addresses for reading the first number of pages of good data; and repeatedly issues the next data-read command with a physical address to the next one of the plurality of storage sub-units before receiving the m pages of the first number of pages of good data corresponding to each data-read command, which has been issued, from one of the plurality of storage sub-units until the last data-read command is issued.

18. An apparatus for GC (Garbage Collection) in a flash memory, comprising:
a channel, coupled to a plurality of storage sub-units;
a processing unit, coupled to the channel, scheduling a plurality of data-read commands with physical addresses for reading a first number of pages of good data, wherein the first number is a product of n and m, and n indicates a quantity of the plurality of storage sub-units sharing one channel and m indicates a basic quantity of pages for programming data into one of the plurality of storage sub-units; in a first time period, repeatedly issuing the next data-read command with a physical address to the next one of the plurality of storage sub-units before receiving good data corresponding to each data-read command, which has been issued, from one of the plurality of storage sub-units until the last data-read command is issued; and in a second time period following the first time period, directing the plurality of storage sub-units to program the first number of pages of good data.

19. The apparatus of claim 18, wherein the processing unit stores the first number of pages of good data in a DRAM (Dynamic Random Access Memory).

20. The apparatus of claim 18, wherein the data-read commands with the physical addresses are issued through a data line shared by the plurality of storage sub-units and each page of good data is received through the data line.

* * * * *